United States Patent [19]

Simone

[11] 3,912,532

[45] Oct. 14, 1975

[54] UREA-FORMALDEHYDE COATED CLAY PARTICLES, AS AN OPACIFYING AGENT

[75] Inventor: Dominic Simone, Lincroft, N.J.

[73] Assignee: NL Industries, Inc., New York, N.Y.

[22] Filed: Jan. 17, 1974

[21] Appl. No.: 434,028

[52] U.S. Cl............ 106/308 N; 106/72; 106/288 Q; 162/181
[51] Int. Cl.² .......................................... C09C 1/42
[58] Field of Search.. 106/308 N, 72, 288 B, 288 Q; 260/39 SB; 117/100 S

[56] References Cited
UNITED STATES PATENTS
3,003,990  10/1961  Umlard et al. ................... 106/308 N
3,427,278   2/1969  Siuta .............................. 106/308 N Primary Examiner—Winston A. Douglas
Assistant Examiner—J. V. Howard

[57] ABSTRACT

Natural clay particles have been encapsulated with a coating of finely divided particles of an urea-formaldehyde polymer which have been formed and polymerized onto the surface of the clay particles. The amount of urea-formaldehyde polymeric particles formed as the coating on the clay particles is from 5 to 96% by weight based on the total weight of the coated product.

The clay particles employed possess a size range from 0.1 to 8 $\mu$. The size of the urea-formaldehyde particles which form the coating on the clay particles are of size from 0.1 to 0.8 $\mu$. The coated clay particles possess a size range from 0.2 to 10 $\mu$.

1 Claim, 2 Drawing Figures

UREA-FORMALDEHYDE COATED CLAY PARTICLES, AS AN OPACIFYING AGENT

BACKGROUND OF THE INVENTION

Natural and synthetic silicate particles have been used for many years as opacifiers, extenders, fillers, coating agents, etc. in the paint and paper industries. Such products are less expensive to employ than high grade pigment opacifiers such as $TiO_2$, ZnO, ZnS, and the like.

However, these silicate products possess lower opacifying properties than the high grade pigment opacifiers.

In recent years particles of urea-formaldehyde have been prepared and it has been found that the urea-formaldehyde particles possess high opacifying properties, similar to the properties of the high grade pigments. Urea-formaldehyde particles are rather expensive to prepare for use as an opacifying agent when used alone.

It has been discovered in the instant invention that clay particles coated with finely divided particles of urea-formaldehyde polymers possess improved opacity properties and are relatively inexpensive to employ as an opacifying agent.

SUMMARY OF THE INVENTION

Natural clay particles are coated with particles of urea-formaldehyde resin forming coated particles of size from 0.2 to 10 microns, the amount of urea-formaldehyde resin particles present as the coating on the clay particles being from 5 to 96% by weight based on the total weight of the coated particles. The urea-formaldehyde coating on the silicate particles is composed of finely divided particles of the urea-formaldehyde polymer, the size of the polymer particles being from 0.1 to 0.8 $\mu$. The clay particles possess a size range from 0.1 to 8 $\mu$.

The particles are coated with the urea-formaldehyde resin by dispersing the clay particles in a aqueous solution of a prepolymer of urea-formaldehyde and polymerizing the urea-formaldehyde onto the surface of the clay particles by a particular method which is described in detail below.

DESCRIPTION OF THE DRAWINGS

Referring to the drawings.

DESCRIPTION OF THE PREFERRED EMBODIMENTS

Figure 1:
FIG. 1 is a photomicrograph of a cross-section of clay particles 10 which are covered with a polymerized urea-formaldehyde coating, said coating comprising finely divided particles 11 of the urea-formaldehyde polymer having a particle range from 0.1 to 0.8 $\mu$.
Figure 2:
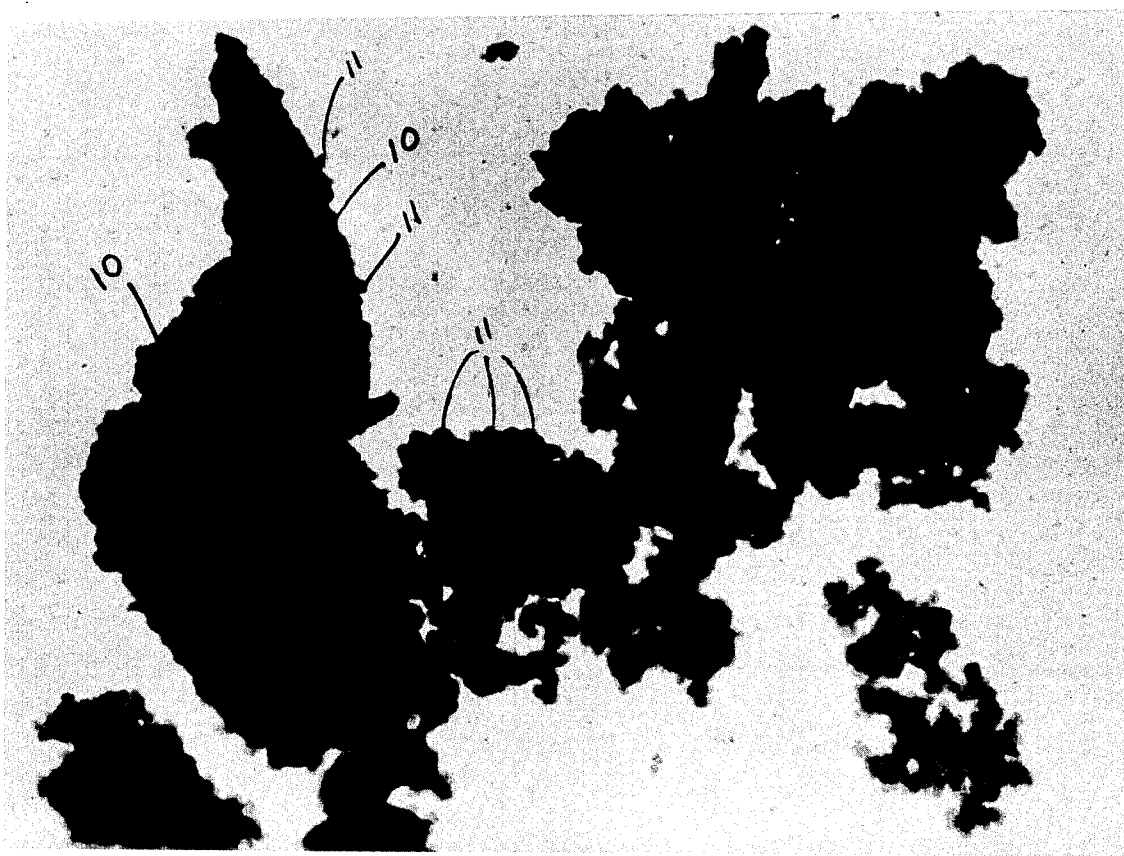
FIG. 2 is a similar photomicrograph which shows the clay particles 10 covered with the polymeric particles 11 of the urea-formaldehyde coating, the coating being thick enough to block out from view the edges of the clay particles.

The coated clay particles are prepared by dispersing these clay particles in an aqueous solution of an urea-formaldehyde prepolymer and polymerizing the resin onto the surface of the clay particles.

An urea-formaldehyde prepolymer is selected in which the mole ratio of the formaldehyde to the urea is from 0.8 – 2.0 to 1.0. a water solution of this urea-formaldehyde prepolymer is prepared which contains from 20 to 60% solids by weight.

The clay particles of size from 0.1 to 8 $\mu$ are readily dispersed in the aqueous solution of the urea-formaldehyde prepolymer to form a suspension. The amounts of the urea-formaldehyde prepolymer and the clay particles employed in the suspension are from 5 to 96% by weight based on the total weight of the urea-formaldehyde and clay particles.

The amount of solids in the final urea-formaldehyde clay suspension should be from 20 to 50% by weight. This suspension is then heated preferably to 50 °C., although any temperature from room temperature to 90 °C is satisfactory.

The suspension is then acidified to lower the acidity to pH below 3.0 to polymerize and gel the resin. The gelled mixture is then allowed to cure for a period of from ½ to 3 hours.

The gelled mass is then broken up without drying and dispersed in water to form a slurry. The slurry is then neutralized to pH of 6–8. The solids are removed by filtration or centrifuging and are washed, dried and milled. It has been discovered that, if the gelled mass is dispersed in water (without drying prior to dispersion), the urea-formaldehyde polymeric particles are small in size (i. e. 0.1 to 0.8 $\mu$), and these particles coat the clay particles completely. If, on the other hand, the gel is allowed to dry before dispersing and neutralizing, the urea-formaldehyde forms large particles of size from 2 to 20 $\mu$ which are hard and grainy. Drying at temperatures above 100 °C produces even larger and harder particles. In addition these large particles tend to agglomerate with one another forming excessively large and hard particles which are difficult to grind. These large size urea-formaldehyde particles are to be avoided, since the larger particles possess inferior properties when used as an opacifier for paper.

It has been discovered that, as the urea-formaldehyde prepolymer is polymerized, it is necessary to form a solid gelled mass of the polymer-clay mixture. The gel also must be allowed to remain standing for at least ½ hour up to 3 hours to polymerize the polymer sufficiently. In contrast to this procedure, if the gel is not allowed to form properly during polymerization, a colloidal solution of the urea-formaldehyde polymer is formed which produces colloidal particles which are too small to be of use for opacification purposes.

As stated previously, after the gel has been properly prepared, the gelled mass of urea-formaldehyde-clay particles is then dispersed without drying in water to form the coated clay particles of the instant invention, the coating being finely divided particles of urea-formaldehyde, having a size range from 0.1 to 0.8 $\mu$.

In order to describe the instant invention in more detail the following examples are presented:

EXAMPLE 1

729 g of an aqueous formaldehyde solution (37%) were neutralized to a pH of 8.5 with a sodium hydroxide solution. 270 g of urea were added and the mixture condensed for ½ hour at 90 °C. At the end of this period, 90 g of urea were added and the temperature adjusted to 70 °C.

The condensation reaction was then continued for an additional half hour to form the urea-formaldehyde prepolymer.

420 g of kaolin clay were dispersed in 200 g of deionized water containing in solution 0.42 g of sodium hexametaphosphate.

The clay dispersion was mixed with 360 g of the urea-formaldehyde prepolymer solution and the temperature of the slurry was adjusted to 50 °C.

A solution of 6.4 g of sulfamic acid in 364 g of water was prepared and heated to 50 °C.

The clay dispersion in the urea-formaldehyde prepolymer solution was mixed with the acid solution and the precipitated resin formed a gel which on standing was allowed to cure for 2 hours at 65 °C.

The gelled mass was broken up and was dispersed in 1 liter of water, neutralized with a NaOH solution to pH 7.5, filtered, washed on the filter with some additional water then dried at 75 °C. The dried product was then passed through an impact stud pulverizer.

The thermogravimetric analysis (TGA) showed that the product had the following composition: 74% clay, 26% urea-formaldehyde polymer.

The transmission electron microscope (TEM) observation of the product indicated that it consisted of clay particles coated with finely divided particles of urea-formaldehyde polymer. The coated clay product, fluffy in nature, was markedly different from the uncoated clay.

The coated clay product had a bulk density (after five minutes on a shaker) of 0.265 g/cc as compared to a bulk density of 0.863 g/cc for the uncoated clay.

The brightness of the coated clay product was 90.41% as compared to the brightness of the uncoated clay particles which was only 80.57%.

The clay particles used in this example had an average particle size of 1.2 $\mu$. The urea-formaldehyde particles coating the clay particles had an average size of 0.2 $\mu$. The coated clay particles had an average size of 6 $\mu$.

This product was used in a paper coating composition as follows: 100 parts of the coated clay particles were mixed with 6 parts of a styrene-butadiene latex (50% solids) and 12 parts of oxidized starch. A second coating composition containing 100 parts of clay, instead of the coated clay, was prepared as a control.

A 31 to 34 lbs./ream base stock paper was coated on one side with the two coating compositions at a spreading rate of 6 lbs./ream. The opacity of the paper coated with the composition containing the coated clay was 82.0%, while the opacity of the paper coated with the control composition (i. e. uncoated clay) was only 77.5%.

The coated paper was calendered at 6 nips at 600 pli and at a speed of 50 ft./minute.

EXAMPLE 2

In this example the procedure of Example 1 was repeated except that the clay was coated with 74% urea-formaldehyde.

The operational details and results are recorded in Table 1, along with those of Example 1. In both cases the clay particles were coated with the finely divided particles of urea-formaldehyde polymers (i. e., 0.1 – 0.8 $\mu$ in size). The bulk densities obtained were much less than that of the uncoated clay control runs and the brightnesses were greatly improved over the brightness of the uncoated clay particles.

EXAMPLES 3 – 8

In these examples the procedure of Example 1 was repeated with varying amounts of urea-formaldehyde and clay and substantially the same improvements were obtained. In these runs the coated products were used as filler pigments in paper instead of using them in paper coatings. The paper formed contained 10% of the filler pigment and the weight was 40 lbs. per ream. The results are also recorded in Table 1.

EXAMPLES 9 – 12

In these examples the procedure of Example 1 was used except that various curing times and temperatures were used with various amounts of agents. The coated products were used as filler pigments in paper.

Again the operational details and results obtained are recorded in Table 2. It should be noted that the bulk densities of the coated clay particles were lowered, while the brightnesses were increased.

EXAMPLES 13 –17

In these examples the procedure was repeated except that various acids were used in place of sulfamic acid. They are listed as follows:

| EXAMPLE NO. | ACID USED |
| --- | --- |
| 13 | Toluene sulfamic |
| 14 | Oxalic |
| 15 | Hydrochloric |
| 16 | Sulfamic |
| 17 | Phosphoric |

Again, all of the products has decreased bulk density and increased brightness.

EXAMPLES 18 – 19

In these examples similar results were obtained using the following urea to formaldehyde ratio:

| EXAMPLE NO. | UREA | FORMALDEHYDE |
| --- | --- | --- |
| 18 | 1 | 1 |
| 19 | 1 | 1.25 |

It has been stated above that, in order to produce the finely divided urea-formaldehyde particles, it is necessary to disperse and neutralize the gelled mass before drying. The following control run was made in order to show that the urea-formaldehyde forms undesirable size particles when the gelled mass is allowed to dry.

EXAMPLE 20

The procedure of Example 6 was repeated except that after the gelled mass was formed, the mass was broken up and pressed to remove a portion of the water, dried overnight at room temperature and cured at 110 °C for 16 hrs. The dried product was then milled in a ball mill for 5 hrs. The milled product contained very hard particles of clay and resin which was screened on 100 mesh screen to remove the oversize agglomerates. The oversize agglomerates discarded were 52.5% of the total product produced. The screened product upon T. E. M. examination showed that the urea-formaldehyde polymer appeared to be in the form of a fused mass of resin surrounding a number of clay particles. The fused mass of resins enveloping

TABLE 1

| | EXAMPLE NO. | | | | | | | |
|---|---|---|---|---|---|---|---|---|
| | 1 | 2 | 3 | 4 | 5 | 6 | 7 | 8 |
| Urea-formaldehyde % | 26 | 74 | 4 | 10 | 26 | 51 | 74 | 88 |
| Clay % | 74 | 26 | 96 | 90 | 74 | 49 | 26 | 12 |
| Total Solids at Cure % | 46.4 | 15.5 | 25.5 | 51.3 | 32.3 | 29 | — | 25.6 |
| Bulk Density (g/cc) of Coated Clay Product | 0.265 | 0.194 | 0.268 | 0.30 | 0.265 | 0.20 | 0.108 | 0.083 |
| Bulk Density (g/cc) of Uncoated Clay Control | 0.863 | 0.863 | 0.963 | 0.963 | 0.963 | 0.963 | 0.963 | 0.963 |
| Brightness (%) of Coated Clay Product | 90.41 | 94.57 | 86.61 | 86.67 | 90.41 | 91.7 | 94.5 | 97.01 |
| Brightness (%) of Uncoated Clay Control | 80.57 | 80.57 | 80.57 | 80.57 | 80.57 | 80.57 | 80.57 | 80.57 |
| Improvement in Brightness % | 9.8 | 14.0 | 6.1 | 6.1 | 9.9 | 11.2 | 14.0 | 16.5 |
| Use of Product in Paper | Coating | Coating | Filler | Filler | Filler | Filler | Filler | Filler |
| Opacity (%) of Paper Using Coated Clay Product | 82.0 | 79.8 | — | — | — | 79.12 | 83.6 | — |
| Opacity (%) of Paper Using Uncoated Clay Control | 77.5 | 77.5 | — | — | — | 77.8 | 77.8 | — |

TABLE 2

| | EXAMPLE NO. | | | |
|---|---|---|---|---|
| | 9 | 10 | 11 | 12 |
| Urea-formaldehyde % | 93 | 74.3 | 79.7 | 79.7 |
| Clay % | 7 | 25.7 | 20.3 | 20.3 |
| Curing Time Hrs. | 2 | 2 | 1.5 | 1 |
| Curing Temp. °C | 65 | 90 | 65 | 70 |
| Bulk Density (g/cc) of Coated Clay Product | 0.0714 | 0.121 | 0.133 | 0.133 |
| Bulk Density (g/cc) of Uncoated Clay Control | 0.963 | 0.963 | 0.963 | 0.963 |
| Brightness (%) of Coated Clay Product | 98.62 | 95.47 | 95.51 | 95.51 |
| Brightness (%) of Uncoated Clay Control | 80.57 | 80.57 | 80.57 | 80.57 |
| Improvement in Brightness % | 18.1 | 14.9 | 15.0 | 15.0 |
| Use of Product in Paper | Filler | Filler | Filler | Filler |
| Opacity (%) of Paper Using Coated Clay Product | 84.78 | — | — | — |
| Opacity (%) of Paper Using Uncoated Clay Control | 77.8 | — | — | — | a number of clay particles has a size range greater than 5 microns.

When this undesirable product was used in paper as an opacifying filler, at 10% concentration, the paper sheet obtained possessed an opacity of 76.36% at 40 lbs. per ream, as compared to an opacity of 79.12 for the paper prepared in Example 6.

This opacity percentage is lower than the opacity obtained when uncoated clay is used which is 77.8%.

From the above description and by the examples presented it has been shown that when clay particles are coated with finely divided particles of urea-formaldehyde, the bulk density of the coated clay particles is greatly reduced and the brightness considerably improved. When the coated clay particles of this invention are used as coating or filler pigments in paper, the opacity of the paper is greatly increased over that obtained when uncoated clay particles are employed.

Other advantages of the urea-formaldehyde coated clay product of the instant invention when used in paper are the improved retention of the product and improved two sidedness of the paper.

While this invention has been described and illustrated by the examples shown, it is not intended to be strictly limited thereto, and other variations and modifications may be employed within the scope of the following claims.

I claim:

1. An opacifying agent for paper comprising plate-like clay particles coated with a polymeric resin of urea-formaldehyde, said coated particles having a size range from 0.2 to 10.0 $\mu$, said clay particles having a size range from 0.1 to 8.0 $\mu$, and said coating comprising urea-formaldehyde polymeric particles of size from 0.1 to 0.8 $\mu$, said urea-formaldehyde coating being present in amount from 5 to 96% by weight based on the total weight of the coated particles.

* * * * *